July 4, 1961 C. W. STRONG 2,991,398
METER BOX
Original Filed May 5, 1952

INVENTOR
Carll W. Strong
BY
ATTORNEY

2,991,398
METER BOX

Carll W. Strong, 1732 Mizell Ave., Winter Park, Fla., assignor, by decree of distribution, to Helen Wills Strong
Continuation of application Ser. No. 286,118, May 5, 1952. This application Sept. 13, 1956, Ser. No. 609,609

5 Claims. (Cl. 317—109)

This invention relates to a meter box, and more particularly to a box for housing a type S, socket type, electric meter. This application is a continuation of my copending application, now abandoned, Serial No. 286,118, filed May 5, 1952, for "Meter Box."

It is desirable to have the glass cover of the meter, which is usually cylindrical, project beyond the face of the box; and it is also desirable to have the front cover for the box form a tight seal when in closed position, but to be readily removable for meter testing, removal of the meter and other purposes.

Previously, for this type of meter, the box was provided with an upstanding rolled or formed flange upon which the extended flange at the base of the meter rested, and a separate sealing ring was needed to clamp around the upstanding flange of the meter box and at the same time around the meter base flange, to provide for a seal to fasten the meter in place in the box.

An object of my invention is to provide a meter box in which a socket type meter is fastened in place in the box by means of a friction flange and the front of the meter box, and no separate sealing ring is needed.

Another object of my invention is to provide a meter box in which the danger of meter glass breakage by tightening a sealing ring too tightly is obviated.

Another object of my invention is to provide a meter box which will permit the use of any type of socket meter, will make installation easier, render the meter box more accessible for inspection, provide more wiring space and permit the installation of larger conduit than is possible with the meter boxes in use today.

Another object of my invention is to provide a meter box for socket type electric meters which is provided with a swing lug sealing arrangement, to increase the speed of inserting the sealing lock, or seal, and to permit the removal of the cover after the seal is applied.

Another object of my invention is to provide a meter box for socket type electric meters which is simple in construction, economical to manufacture, durable in quality, efficient in operation, reliable in use, and has a cover which can be removed quickly and easily and which provides a tight seal when in closed position.

Other and further objects and advantages of my invention will be apparent from the following description taken in connection with the accompanying drawing in which like characters of reference designate corresponding parts throughout the several views, and wherein.

Figure 1:
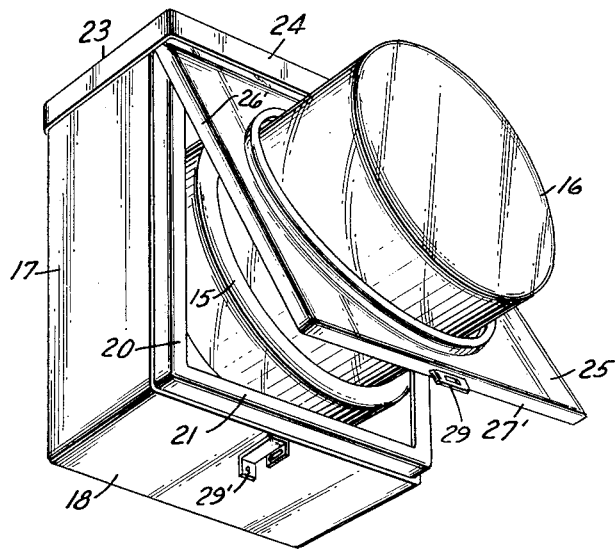
FIG. 1 is a perspective view illustrating my invention.
Figure 2:
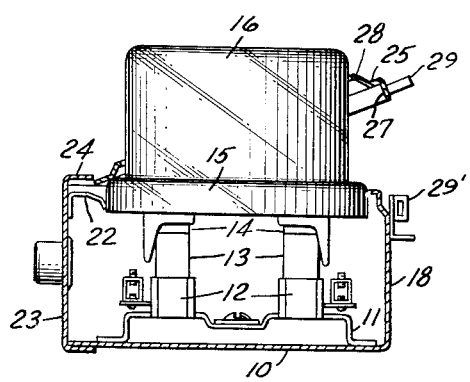
FIG. 2 is a vertical sectional view of the device shown in FIG. 1.
Figure 3:
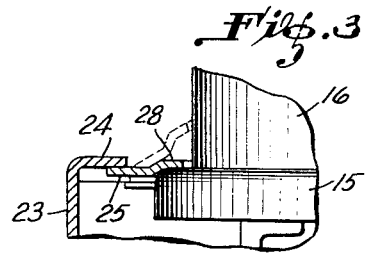
FIG. 3 is an enlarged detail view.

In the embodiment of my invention chosen for purpose of illustration, the meter box has a back wall 10 to the inside of which is secured a support 11, of standard design, which carries a pair of connector blocks 12 on which are mounted the jaws 13 forming sockets which receive and hold the contact blades 14 of the standard type S, socket type electric meter. This type of meter is customarily provided with an extended flange 15 at the base thereof for sealing the projecting meter enclosure 16 in place over the interior working parts (not shown) of the meter.

The side walls 17, 17' and the bottom end wall 18 of the meter box are constructed to be of such a depth that when the meter is in place in the box, with the contact blades 14 held snugly in the jaws 13, the outer or front surface of the extended flange 15 will extend slightly past the plane of the outer edges of the side walls 17, 17' and the end wall 18 and the rear surface of extended flange 15 will abut grounding fingers 19, 19' which extend respectively from the inside of walls 17, 17'.

The outer edge of walls 17, 17' and the outer edge of end wall 18 are flared toward extended flange 15 to form flanges 20, 20' and 21 respectively. Arcuate portions centrally on the free edge of these flanges are removed to form recesses conforming to adjacent section of the periphery of extended flange 15. Flange 22 depends from the inside top 23 of the meter box, extending downwardly and inwardly to bear on the adjacent periphery of extended flange 15 to form a friction fit, urging extended flange 15 against flange 21.

The top 23 of the meter box has a lip 24 depending therefrom, and under which the removable front cover 25 is constructed to fit. The cover 25 has side flanges 26, 26' which overlap the sides of the box, and a lower end flange 27 which overlaps the end of the box. Also, the cover is provided with an opening to receive the projecting enclosure of the meter. This opening is of a diameter greater than the diameter of the projecting meter enclosure, but less than the outside diameter of the meter sealing ring; and the opening is spaced from the upper edge of the cover the exact distance so that when the cover is placed over the projecting meter closure, and the cover is lowered until the upper edge of the opening in the cover contacts the projecting meter closure, the upper edge of the cover substantially contacts but still clears the bottom edge of the lip 24, so that the upper edge of the cover may be slipped beneath the lip 24 as the cover is lowered into place and the opening therein centered about the projecting meter closure.

The opening in the cover 25 may be provided with an outwardly flaring flange 28 extending entirely around the opening. A swing fastening and sealing device of known construction, comprising the cooperating projections 29, 29' on the bottom of the cover 25 and the end wall 18, respectively, is provided for sealing the cover in place on the box, and the construction is such that the cover provides a substantially water-tight closure for the meter box in which a socket type electric meter of ordinary construction is fully protected, is held snugly in place, and yet is readily accessible by the simple removal of a single seal from the swing fastening and sealing device 29, 29', whereupon the cover can be lifted from the box and the meter removed by a simple withdrawing action by hand.

Figure 5:
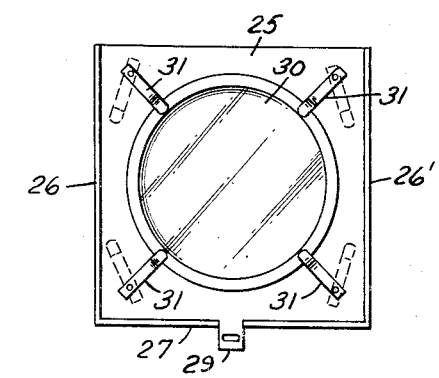
FIG. 5 is the rear view of the front cover of the device shown in FIG. 1 which cover is retaining a replacement glass in place of the meter.
Figure 4:
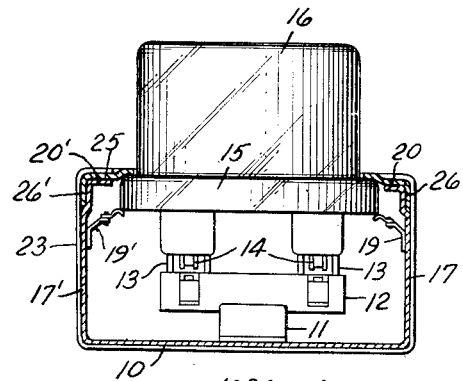
FIG. 4 is a horizontal sectional view of the device shown in FIG. 1.

FIG. 5 illustrates an arrangement where, when meter 16 is removed for repairs or for any other reason, a replacement glass 30 of substantially the same diameter as extended flange 15 may be substituted therefore, being retained in place by rotatably mounted tabs 31 pivotally mounted on the inside surface of cover 25. This glass insert protects the box against the entrance of foreign matter while the meter is not in the box.

It will be obvious to those skilled in the art that many modifications and changes can be made without departing from the scope of my invention as defined in the appended claims.

I claim:

1. A meter box comprising in combination, a back wall, side walls, an end wall and a top forming a casing open at its front; sockets supported on said back wall; a socket type electric meter having contact blades removably received in said sockets and a projecting enclosure sealed in place on said meter by an extended flange at the base of said enclosure; said side walls and said end wall being constructed of such a depth that the front surface of said extended flange lies in substantially the same plane as the outer edges of said walls; a lip depending from said top; and a removable cover constructed to fit under said lip, and being provided with an opening through which the meter enclosure projects for sealing engagement therewith, said opening being of a uniform diameter substantially larger than the diameter of said meter enclosure but smaller than the outside diameter of said extended flange and being spaced from the upper edge of said cover so that when the upper edge of the opening contacts the projecting meter enclosure the upper edge of the cover substantially contacts but still clears the bottom edge of said lip.

2. A meter box comprising in combination, a back wall, side walls, an end wall and a top forming a casing open at its front; a support mounted on said back wall; a pair of connector blocks carried by said support; sockets mounted on said blocks; a socket type electric meter having contact blades removably received in said sockets and a projecting enclosure sealed in place on said meter by an extended flange at the base of said enclosure; said side walls and said end wall being constructed of such a depth that the front surface of said extended flange lies in substantially the same plane as the outer edges of said walls; a lip depending from said top; a removable cover constructed to fit under said lip, and being provided with an opening through which the meter enclosure projects for sealing engagement therewith, said opening being of a uniform diameter substantially larger than the diameter of said meter enclosure but smaller than the outside diameter of said extended flange and being spaced from the upper edge of said cover so that when the upper edge of the opening contacts the projecting meter closure the upper edge of the cover substantially contacts but still clears the bottom edge of said lip; said cover having an outwardly flaring flange entirely surrounding the opening therein; and means for fastening said cover in place on said box.

3. A meter box comprising in combination, a back wall, side walls, an end wall and a top forming a casing open at its front; a support mounted on said back wall; a pair of connector blocks carried by said support; jaws mounted on said blocks; a socket type electric meter having contact blades removably received in said jaws and a projecting enclosure sealed in place on said meter by an extended flange at the base of said enclosure; said side walls and said end wall being constructed of such a depth that the front surface of said extended flange lies in substantially the same plane as the outer edges of said walls; a lip depending from said top; a removable cover constructed to fit under said lip, and having side flanges which overlap said side walls and a lower end flange which overlaps said end wall, and being provided with an opening through which the meter enclosure projects for sealing engagement therewith, said opening being of a uniform diameter substantially larger than the diameter of said meter enclosure but smaller than the outside diameter of said extended flange and being spaced from the upper edge of said cover so that when the upper edge of the opening contacts the projecting meter closure the upper edge of the cover substantially contacts but still clears the bottom edge of said lip; said cover having an outwardly flaring flange entirely surrounding the opening in said cover; and means for fastening said cover in place on said box.

4. A meter box comprising in combination, a back wall, side walls, an end wall and a top forming a casing open at its front; a support mounted on said back wall; a pair of connector blocks carried by said support; jaws mounted on said blocks; a socket type electric meter having contact blades removably received in said jaws and a projecting enclosure sealed in place on said meter by an extended flange at the base of said enclosure; said side walls and said end wall being constructed of such a depth that the front surface of said extended flange lies in substantially the same plane as the outer edge of said walls; conducting fingers grounded to said side walls and abutting said extended flange; a lip depending from said top; a removable cover constructed to fit under said lip, and having side flanges which overlap said side walls and a lower end flange which overlaps said end wall, and being provided with an opening through which the meter enclosure projects, said opening being of a diameter larger than the outside diameter of said extended flange and being spaced from the upper edge of said cover so that when the upper edge of the opening contacts the projecting meter enclosure, the upper edge of the cover almost contacts but still clears the bottom edge of said lip; said cover having an outwardly flaring flange entirely surrounding the opening in said cover; and means for fastening said cover in place on said box.

5. A meter box comprising in combination, a back wall, side walls, an end wall and a top forming a casing open at its front; a support mounted on said back wall; a pair of connector blocks carried by said support; jaws mounted on said blocks; a socket type electric meter having contact blades removably received in said jaws and a projecting enclosure sealed in place on said meter by an extended flange at the base of said enclosure; said side walls and said end wall being constructed of such a depth that the front surface of said extended flange lies in substantially the same plane as the outer edge of said walls; flanges extending inwardly from said side walls and said end wall and abutting said extended flange; a compression member extending from said top and urging said extended flange against said flange on said end wall; conducting fingers grounded to said side walls and abutting said extended flange; a lip depending from said top; a removable cover constructed to fit under said lip, and having side flanges which overlap said side walls and a lower end flange which overlaps said end wall, and being provided with an opening through which the meter enclosure projects, said opening being of a diameter larger than the outside diameter of said extended flange and being spaced from the upper edge of said cover so that when the upper edges of the opening contacts the projecting meter enclosure, the upper edge of the cover almost contacts but still clears the bottom edge of said lip; said cover having an outwardly flaring flange entirely surrounding the opening in said cover; and means for fastening said cover in place on said box.

References Cited in the file of this patent

UNITED STATES PATENTS

| Number | Name | Date |
|---|---|---|
| 1,965,329 | Abbott | July 3, 1934 |
| 2,297,833 | Johansson | Oct. 6, 1942 |
| 2,329,349 | Johansson | Sept. 14, 1943 |
| 2,345,269 | Lackey | Mar. 28, 1944 |
| 2,412,558 | Blank | Dec. 17, 1946 |
| 2,429,093 | Johansson | Oct. 14, 1947 |
| 2,626,309 | Road | Jan. 20, 1953 |
| 2,822,417 | Mathison | Feb. 4, 1958 |